United States Patent
Tsukuda et al.

(10) Patent No.: US 10,629,935 B2
(45) Date of Patent: Apr. 21, 2020

(54) FUEL CELL ELECTRODE CATALYST LAYER, PRODUCTION METHOD THEREFOR, MEMBRANE ELECTRODE ASSEMBLY, AND SOLID POLYMER FUEL CELL

(71) Applicant: Mitsui Mining & Smelting Co., Ltd., Tokyo (JP)

(72) Inventors: Ryoma Tsukuda, Saitama (JP); Naohiko Abe, Saitama (JP); Hiromu Watanabe, Saitama (JP); Susumu Takahashi, Saitama (JP); Kenichi Amitani, Saitama (JP); Akiko Sugimoto, Saitama (JP)

(73) Assignee: MITSUI MINING & SMELTING CO., LTD., Tokyo (JP)

( * ) Notice: Subject to any disclaimer, the term of this patent is extended or adjusted under 35 U.S.C. 154(b) by 310 days.

(21) Appl. No.: 15/505,679

(22) PCT Filed: Oct. 21, 2015

(86) PCT No.: PCT/JP2015/079739
§ 371 (c)(1),
(2) Date: Feb. 22, 2017

(87) PCT Pub. No.: WO2016/063922
PCT Pub. Date: Apr. 28, 2016

(65) Prior Publication Data
US 2017/0279143 A1  Sep. 28, 2017

(30) Foreign Application Priority Data

Oct. 24, 2014 (JP) ................................. 2014-217617
Jul. 1, 2015 (JP) ................................. 2015-133068

(51) Int. Cl.
*H01M 8/1018* (2016.01)
*H01M 8/10* (2016.01)
(Continued)

(52) U.S. Cl.
CPC ......... *H01M 8/1018* (2013.01); *B01J 23/648* (2013.01); *B01J 35/10* (2013.01);
(Continued)

(58) Field of Classification Search
CPC .. H01M 8/1018; H01M 8/1246; H01M 8/106; H01M 8/1004; H01M 4/8626;
(Continued)

(56) References Cited

U.S. PATENT DOCUMENTS 5,861,222 A  1/1999  Fischer et al.
2004/0072061 A1  4/2004  Nakano et al.
(Continued)

FOREIGN PATENT DOCUMENTS

CN  103011125  4/2013
JP  2004-079244  3/2004
(Continued)

OTHER PUBLICATIONS

International Search Report, PCT/JP2015/079739, dated Jan. 26, 2016.
European Search Report, PCT/JP2015/079739, dated Jan. 26, 2016.

*Primary Examiner* — Gary D Harris
(74) *Attorney, Agent, or Firm* — Young & Thompson (57) ABSTRACT

In this fuel cell electrode catalyst layer, a catalyst is supported on a carrier comprising inorganic oxide particles. The fuel cell electrode catalyst layer is provided with a porous structure. When a mercury penetration method is used to measure the pore size distribution of the porous structure, a peak is observed in the range spanning from 0.005 μm to 0.1 μm inclusive, and a peak is also observed in the range (Continued)

spanning from over 0.1 μm to not more than 1 μm. When P1 represents the peak intensity in the range spanning from 0.005 μm to 0.1 μm inclusive, and P2 represents the peak intensity in the range spanning from over 0.1 μm to not more than 1 μm, the value of P2/P1 is 0.2-10 inclusive. It is preferable that the inorganic oxide be tin oxide.

18 Claims, 5 Drawing Sheets

(51) Int. Cl.

| | | |
|---|---|---|
| B01J 35/10 | (2006.01) | |
| H01M 8/02 | (2016.01) | |
| H01M 4/88 | (2006.01) | |
| B01J 37/00 | (2006.01) | |
| H01M 4/86 | (2006.01) | |
| B01J 37/02 | (2006.01) | |
| B01J 37/08 | (2006.01) | |
| B01J 23/648 | (2006.01) | |
| H01M 8/1004 | (2016.01) | |
| H01M 8/106 | (2016.01) | |
| H01M 8/1246 | (2016.01) | |
| H01M 8/124 | (2016.01) | |

(52) U.S. Cl.
CPC .............. *B01J 37/00* (2013.01); *B01J 37/02* (2013.01); *B01J 37/08* (2013.01); *H01M 4/86* (2013.01); *H01M 4/8626* (2013.01); *H01M 4/88* (2013.01); *H01M 8/02* (2013.01); *H01M 8/10* (2013.01); *H01M 8/1004* (2013.01); *H01M 8/106* (2013.01); *H01M 8/1246* (2013.01); *H01M 2008/1293* (2013.01); *Y02E 60/525* (2013.01); *Y02P 70/56* (2015.11)

(58) Field of Classification Search
CPC ............ H01M 8/02; H01M 4/88; H01M 4/86; H01M 8/10; H01M 2008/1293; B01J 37/08; B01J 37/02; B01J 37/00; B01J 35/10; B01J 23/648; Y02E 60/525; Y02P 70/56
USPC ........................................................ 429/492
See application file for complete search history.

(56) References Cited

U.S. PATENT DOCUMENTS

| | | |
|---|---|---|
| 2008/0026282 A1 | 1/2008 | Tamura et al. |
| 2009/0061276 A1* | 3/2009 | Tamura ............... H01M 4/8605 429/502 |
| 2011/0136046 A1 | 6/2011 | Merzougui et al. |
| 2015/0243999 A1 | 8/2015 | Takahashi et al. |

FOREIGN PATENT DOCUMENTS

| | | |
|---|---|---|
| JP | 2005-174835 | 6/2005 |
| JP | 2008-034300 | 2/2008 |
| JP | 2009-146760 | 7/2009 |
| JP | 2010-238668 | 10/2010 |
| WO | WO 2014/136908 | 9/2014 |
| WO | WO 2015/151714 | 10/2015 |

* cited by examiner

FUEL CELL ELECTRODE CATALYST LAYER, PRODUCTION METHOD THEREFOR, MEMBRANE ELECTRODE ASSEMBLY, AND SOLID POLYMER FUEL CELL

TECHNICAL FIELD

This invention relates to an electrode catalyst layer for fuel cells and a method for making the same. The invention also relates to a membrane-electrode assembly (MEA) having the electrode catalyst layer and a polymer electrolyte fuel cell having the MEA.

BACKGROUND ART

A polymer electrolyte fuel cell has a structure composed of a polymer electrolyte membrane, a catalyst layer on each side of the electrolyte membrane, and a gas diffusion layer on the outer side of each catalyst layer. The catalyst layer is generally a porous layer formed of a particulate support having a noble metal catalyst supported on the surface thereof. The porous layer allows a fuel gas, such as hydrogen or methanol, or an oxidizing gas, such as oxygen or air, to pass therethrough to cause an electrode reaction on the three-phase interface, forming water in the catalyst layer.

While the water formed is to dissipate from the catalyst layer, it sometimes accumulates in the catalyst layer. If water accumulation proceeds to exceed the tolerance of the catalyst layer, what we call "flooding" occurs. Conversely, if the catalyst layer has too much drainage, it would dry out. With the object of providing a fuel cell electrode catalyst layer that satisfactorily meets the conflicting demands for good drainage of generated water and moderate moisture retention, Patent Literature 1 below proposes a porous electrode catalyst layer having first pores with a diameter of 0.01 to 0.1 µm and second pores with a diameter of 0.1 to 1 µm. The electrode catalyst layer disclosed contains carbon as a catalyst support.

With a view to providing an electrode catalyst layer that exhibits enhanced water retention without adversely affecting reaction gas diffusion and drainage of water generated by the electrode reaction and thereby achieves high power generation characteristics even under a low humidity condition, Patent Literature 2 below proposes an electrode catalyst layer which comprises a polymer electrolyte and particles having a catalyst substance supported thereon and in which the volume of pores of 1.0 µm or smaller in diameter as measured by mercury intrusion porosimetry and converted by cylindrical approximation increases continuously in the thickness direction from the outside (the surface of the electrode catalyst layer) toward the inside (the polymer electrolyte membrane). The catalyst support contained in the catalyst layer of Patent Literature 2 is carbon similarly to Patent Literature 1.

CITATION LIST

Patent Literature

Patent Literature 1: JP 2009-146760A
Patent Literature 2: JP 2010-238668A

SUMMARY OF INVENTION

The techniques disclosed in Patent Literatures 1 and 2 use carbon as a catalyst support. Because carbon has a hydrophobic surface, water generated by the reaction is well drained from the catalyst layer, and the dry-out problem is rather liable to occur. In contrast, an electroconductive oxide support that has recently been proposed as a new support has a hydrophilic surface and is therefore less prone to develop the dry-out problem but more liable to raise the problem of water accumulation in the catalyst layer.

An object of the invention is to improve an electrode catalyst layer containing an inorganic oxide support. More particularly, the object is to provide a fuel cell electrode catalyst layer having improved power output and small humidity dependence of power output.

The present invention provides an electrode catalyst layer for fuel cells, having a porous structure and comprising a catalyst supported on a particulate inorganic oxide support, the porous structure having a pore size distribution, measured by mercury intrusion porosimetry, showing a first peak in a range of from 0.005 to 0.1 µm and a second peak in a range of from greater than 0.1 µm to 1 µm, the ratio of the intensity P2 of the second peak to the intensity P1 of the first peak, P2/P1, being 0.2 to 10.

The present invention also provides a fuel cell membrane-electrode assembly comprising a polymer electrolyte membrane and the above described catalyst layer formed on at least one side of the polymer electrolyte membrane; and a polymer electrolyte fuel cell comprising the membrane-electrode assembly, the catalyst layer being a cathode catalyst layer.

The present invention further provides a method for making an electrode catalyst layer for fuel cells, comprising the steps of:

granulating particles of an inorganic oxide precursor,
firing the resulting granules to convert the precursor to an inorganic oxide,
applying a catalyst to the fired granules to form granules having the catalyst supported thereon,
preparing an ink containing the granules having the catalyst supported thereon, and
applying the ink to form an electrode catalyst layer for fuel cells.

The present invention furthermore provides a method for making an electrode catalyst layer for fuel cells, comprising the steps of:

granulating particles of an inorganic oxide,
applying a catalyst to the resulting granules to form granules having the catalyst supported thereon,
preparing an ink containing the granules having the catalyst supported thereon, and
applying the ink to form an electrode catalyst layer for fuel cells.

DESCRIPTION OF EMBODIMENTS

Figure 1:
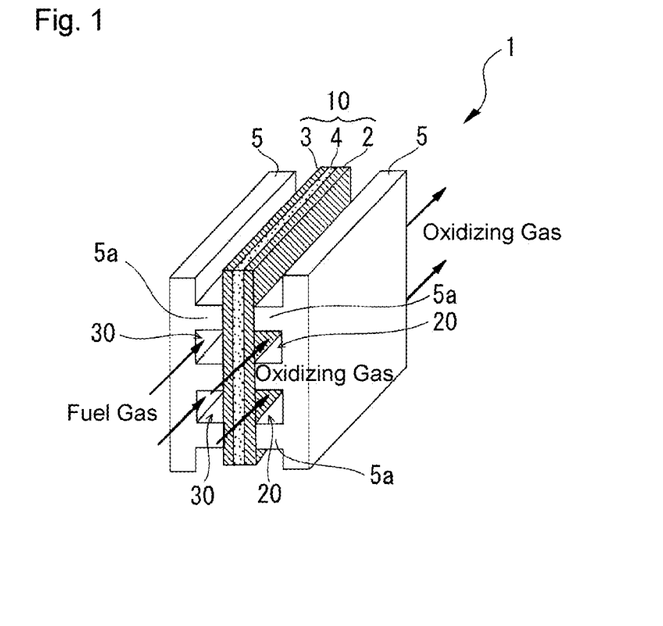
FIG. 1 is a perspective view of an embodiment of a polymer electrolyte fuel cell having the electrode catalyst layer of the invention.

The invention will be described on the basis of its preferred embodiments with reference to the accompanying drawings. FIG. 1 illustrates an embodiment of the invention. The polymer electrolyte fuel cell 1 illustrated in FIG. 1 includes an MEA 10. The MEA 10 is composed of a polymer electrolyte membrane 4, a cathode 2 on one side of the polymer electrolyte membrane 4, and an anode 3 on the other side. The fuel cell 1 further includes a pair of separator 5, 5 between which the MEA 10 is sandwiched to make up a unit cell.

As illustrated in FIG. 1, the cathode 2, anode 3, and electrolyte membrane 4 have the same shape (e.g., an oblong rectangle) and generally the same size. As illustrated, each separator 5 is a bipolar plate having a plurality of ribs 5a extending in one direction on its side facing the MEA 10. The plurality of ribs 5a are provided with spacing, and the spacing is substantially regular. On the side of the separator 5 facing the cathode 2 of the MEA 10, the space between adjacent ribs 5a provides an oxidizing gas flow path 20 for supplying an oxidizing gas to the cathode 2. On the side of the separator 5 facing the anode 3 of the MEA 10, the space between adjacent ribs 5a provides a fuel gas flow path 30 for supplying a fuel gas to the anode 3.

The cathode 2 includes a catalyst layer (unshown) located in contact with one side of the electrolyte membrane 4 and a gas diffusion layer (unshown) located in contact with the catalyst layer. The catalyst layer has a support having a catalyst supported thereon. The anode 3 has the same structure as described with respect to the cathode 2. The support contained in the catalyst layer is a particulate inorganic oxide.

The catalyst layer has a porous structure. The porous structure is mostly formed of the inorganic oxide particles serving as an electrode catalyst support and provides a three-phase interface for the electrode reaction. The catalyst layer is characterized by its porous structure. Specifically, the porous structure of the catalyst layer has a pore size distribution showing a peak in a range of from 0.005 to 0.1 μm and a peak in a range of from greater than 0.1 μm to 1 μm as measured by mercury intrusion porosimetry. A catalyst layer with a porous structure having a pore size distribution showing these peaks has portions with a large pore size and portions with a small pore size. This structure effectively achieves supply of substances to the whole catalyst layer and allows water generated by the reaction to be drained efficiently. In what follows, the pore size range of from 0.005 μm or more to 0.1 μm or less and the pore size range of from greater than 0.1 μm to 1 μm or less will be referred to as a first range and a second range, respectively, and the peak observed in the first range and the peak observed in the second range will be referred to as a first peak and a second peak, respectively.

The pore size distribution of the catalyst layer measured by mercury intrusion porosimetry shows at least one first peak in the first range and at least one second peak in the second range. It is preferred, in particular, that only one first peak be observed in the first range. Likewise, it is preferred that only one second peak be observed in the second range. In such cases, the task of providing channels for making the substance participating in the electrode reaction flow is divided more clearly in the catalyst layer. As a result, water can be drained efficiently even when the catalyst support is highly hydrophilic, and diffusion of the substance participating in the electrode reaction is less prone to be hindered.

It is especially preferred that only one first peak be observed in a range of from 0.005 to 0.08 μm, more preferably from 0.005 to 0.05 μm, within the first range. With respect to the second peak in the second range, it is preferred that only one second peak be observed in a range of from 0.2 to 1 μm, more preferably 0.2 to 0.9 μm. In such cases, drainage of water is carried out more efficiently, and diffusion of the substance participating in the electrode reaction is still less prone to be hindered.

The ratio of the intensity of the peak (peak intensity P2) observed in the second range to the intensity of the peak (peak intensity P1) observed in the first range, i.e., P2/P1, is preferably 0.2 to 10, more preferably 0.3 to 10, even more preferably 0.5 to 10, still even more preferably 0.5 to 5, most preferably 0.84 to 3. The P2/P1 value being in the above range, the portions with a large pore size and the portions with a small pore size are well balanced in the catalyst layer. Thus, drainage of water is carried out more efficiently, and diffusion of the substance participating in the electrode reaction is still less prone to be hindered. As a result, the fuel cell achieves an improved power output and reduced dependence of output on humidity. According to the disclosure of Patent Literature 1 cited above, in contrast, the peak intensity in the second range is very low, and the proportion of the pores in the second range is very small, in the catalyst layer disclosed in Patent Literature 1. This is considered to be because the catalyst support used in Patent Literature 1 is water-repellent carbon so that good drainage of the catalyst layer is obtained without providing a great number of large pores.

In the following description, the P2/P1 value will be referred to as a peak intensity ratio. In calculating the peak intensity ratio, when there is only one first peak in the first range, P1 is defined to be the intensity of that peak. When there are two or more first peaks in the first range, P1 is defined to be the intensity of the highest of the first peaks. The same definitions apply to the intensity P2 of the second peak or peaks observed in the second range.

The pore size distribution is determined by mercury intrusion porosimetry, specifically according to the following procedure.

Method for determining pore size distribution by mercury intrusion porosimetry:

AutoPore IV Model 19520 from Shimadzu Corp. may be used, for example. In detail, the procedure described in JIS R1655 is followed. For example, a sample powder is put in a sample cell; and while a pressure continuously increasing from 0 up to 60,000 psi (4137 kPa) is applied to the sample, the volume of mercury that penetrates the sample under the pressure is estimated from the electrostatic capacity to obtain the relationship between the pore size and pore volume.

In order to obtain a catalyst layer with the above-specified pore size distribution measured by mercury intrusion porosimetry, the catalyst layer may be formed by using an ink containing a granular support made of a particulate inorganic oxide as will be described later.

The structure of the catalyst layer of the cathode 2 is preferably such that every part of it is composed of a portion with a large pore size and a portion with a small pore size. A part of the catalyst layer may not contain both a portion with a large pore size and a portion with a small pore size as long as the catalyst layer satisfies the above described ratio between P1 and P2 as a whole. For example, a part of the catalyst layer in the thickness direction that is in contact with the electrolyte membrane (this part will hereinafter also be referred to as an EM side portion) may not have the above described structure, and/or a part of the catalyst layer in the thickness direction that is in contact with the gas diffusion layer (this part will hereinafter also be referred to as a GDL side portion) may not have the above described structure.

The EM side portion and the GDL side portion of the catalyst layer may have a dense structure that is denser than other portion of the catalyst layer. For example, the EM side portion and the GDL side portion may have a pore size distribution showing a peak in only the range of 0.1 µm or smaller as measured by mercury intrusion porosimetry. With the EM side portion and the GDL side portion having such a pore size distribution, the physical contact between the catalyst layer and the electrolyte membrane and/or the gas diffusion layer will be sufficient, thereby holding down an increase in electrical resistance and improving the power generation characteristics of the fuel cell. Further, the catalyst layer will have improved mechanical strength thereby to improve the durability of the fuel cell.

The catalyst layer may have either one of or both of the EM side portion and the GDL side portion. The EM side portion and/or the GDL side portion may be formed by, for example, separately applying two or more catalyst inks having different characteristics to make the catalyst layer.

The support contained in the catalyst layer of the cathode 2 is a particulate inorganic oxide. The inorganic oxide can be, for example, a metal oxide or a non-metal to semi-metal oxide. It is preferred for the inorganic oxide to have electron conductivity in order to increase the electron conductivity of the catalyst layer of the cathode 2. For example, an inorganic oxide having a volume resistivity of 1 MΩcm or less is preferably used. Examples of useful inorganic oxides include indium-based oxides, tin-based oxides, titanium-based oxides, zirconium-based oxides, selenium-based oxides, tungsten-based oxides, zinc-based oxides, vanadium-based oxides, tantalum-based oxides, niobium-based oxides, and rhenium-based oxides. Preferred of them are tin oxides containing at least one of niobium, tantalum, antimony, and tungsten. Tin oxide containing fluorine is also useful. Specific examples of the useful inorganic oxides include tin-containing indium oxide and non-metal to metal-containing (doped) tin oxides, such as, antimony-containing tin oxide, fluorine-containing tin oxide, tantalum-containing tin oxide, tantalum- and antimony-containing tin oxide, tungsten-containing tin oxide, and niobium-containing tin oxide.

In view of obtaining the above described pore size distribution of the catalyst layer as measured by mercury intrusion porosimetry and securing a high specific surface area of the support for supporting the catalyst, it is preferred for the support to have a primary particle size of 5 to 200 nm, more preferably 5 to 100 nm, even more preferably 5 to 50 nm. The primary particle size of the support is determined by measuring the length of 500 or more particles on an electron micrograph of a cross-section of the catalyst layer and calculating the average length. The support preferably has a BET specific surface area of 10 to 500 $m^2/g$.

The catalyst to be supported on the inorganic oxide support may be selected from those conventionally used in the art, such as platinum, alloys of platinum with other noble metals (e.g., ruthenium, rhodium, and iridium), and alloys of platinum with base metals (e.g., vanadium, chromium, cobalt, nickel, iron, and titanium). The catalyst preferably has an average particle size of 1 to 10 nm on the surface of the support in terms of efficient development of the catalyst performance.

The method for applying the catalyst to the support is not particularly limited. Any method known in the art may be adopted. For example, when platinum is used as a catalyst, chloroplatinic acid hexahydrate ($H_2PtCl_6 \cdot 6H_2O$), dinitrodiammine platinum ($Pt(NH_3)_2(NO_2)_2$), or the like can used as a platinum source, and platinum can be loaded on the support by reducing the platinum source by a known process, such as liquid phase chemical reduction, gas phase chemical reduction, impregnation-reductive pyrolysis, the colloid method, or surface-modified colloid-reductive pyrolysis. The amount of the catalyst on the support is preferably 1 to 70 mass %, more preferably 5 to 20 mass %, relative to the mass of the support.

In order to ensure prevention of water accumulation in the catalyst layer ascribed to the hydrophilicity of the surface of the inorganic oxide particles, it is effective to incorporate into the catalyst layer a highly hydrophobic substance having higher hydrophobicity than the inorganic oxide.

When needed, the catalyst layer of the cathode 2 may contain a material known in the art, such as a binder for binding particles or an ionomer, in addition to the substances hereinabove described. It is desirable, however, that the catalyst layer not contain a nonionic polymer because a nonionic polymer tends to increase the hydrophilicity of the catalyst layer. Nonionic polymers include polyethers, polyamides, and polyurethanes. It is also desirable that the catalyst layer not contain the nonionic polymer described in Patent Literature 1.

While the cathode 2 of the MEA 10 has been described, the above described structure equally applies to the anode 3. Nevertheless, because the catalyst layer of the anode 3 is less liable to flooding than that of the cathode 2, it is not essential for the catalyst layer of the anode 3 to have the above described pore size distribution. Furthermore, because the catalyst layer of the anode 3 is not exposed to high potential during operation of the fuel cell, it is not essential for it to use an inorganic oxide as a catalyst support. Therefore, the catalyst support of the anode 3 may be a carbon material.

The polymer electrolyte membrane 4 can be of a material that is chemically stable in the environment in a fuel cell and has high proton conductivity. The polymer electrolyte membrane 4 is preferably made of a material that has no electron conductivity and does not easily allow crossover of gas therethrough to occur. A suitable example of such a material is perfluoropolyethylene having a sulfonic group bonded to its main chain. In addition, polysulfones, polyether sulfones, polyether ether sulfones, polyether ether ketones, and sulfonated hydrocarbon polymer are also useful.

The gas diffusion layer is preferably of a material having electron conductivity and structurally capable of diffusing an oxidizing gas and a fuel gas to the cathode 2 and the anode 3, respectively, through the oxidizing gas flow path 20 and the fuel gas flow path 30, respectively. Such a material can be a porous material made mainly of a carbon-containing material. Specifically, a porous carbon material formed of carbon fiber, such as carbon paper, carbon cloth, or carbon nonwoven cloth, may be used. These materials may be subjected, before use, to a surface treatment, such as water repellent treatment or hydrophilization treatment.

The separator 5 may be of any materials having electron conductivity and capable of forming the oxidizing gas flow path 20 and the fuel gas flow path 30. Examples of such materials include metal, e.g., stainless steel, carbon, and a carbon/resin mixture.

A preferred method for making the catalyst layer will then be described. The method includes the steps of (1) preparing a particulate precursor of an inorganic oxide support, (2)

granulating the particulate precursor, (3) firing the granules, (4) applying a catalyst, and (5) forming a catalyst layer (this method will hereinafter be referred to as method 1). The steps (1) to (5) will be described in detail.

In step (1), a particulate precursor of an inorganic oxide as a support is prepared. In the case when the inorganic oxide is tin oxide, for example, a tin-containing compound in the form of an aqueous solution is hydrolyzed in the presence of an acid or a base to precipitate precursor particles of a hydroxide, an oxyhydroxide, or the like. The tin-containing compound is exemplified by sodium stannate or tin tetrachloride. Examples of the acid or base used for hydrolysis include mineral acids, such as nitric acid, and alkali metal hydroxides, such as sodium hydroxide. In preparing tin oxide doped with other elements such as niobium or tantalum, the tin-containing compound aqueous solution is hydrolyzed with an acid or a base in the co-presence of a compound containing niobium or tantalum.

The precursor particles obtained in step (1) are separated from the liquid phase and fired. The purpose of firing is to remove a salt or water from the precursor (raw material). Firing may be carried out in an oxygen-containing atmosphere, e.g., the atmospheric air. The firing temperature is preferably 250° C. to 1000° C., more preferably 250° C. to 600° C. The firing is performed until a salt or water is sufficiently removed from the precursor (raw material). It is not necessary to form the aimed inorganic oxide by the firing.

The particulate precursor fired under the conditions above is subjected to the granulation step (2) to obtain granules. The particulate precursor may have its particle size adjusted prior to granulation so that the resulting granules may have more uniform size. The particle size of the precursor can be adjusted by grinding using a media mill, such as ball mill. The particulate precursor may be coarsely crushed by a given means before grinding.

The particulate precursor can be granulated by spray drying granulation, tumbling granulation, fluidized bed granulation, agitation granulation, compression granulation, extrusion granulation, disintegrating granulation, or the like. Of these granulation techniques spray drying granulation is preferred in terms of ease of forming a catalyst layer with a desired pore size distribution. From the same viewpoint, the granulation is preferably performed so that the resulting granules may have an average particle size of 0.05 to 10 μm, more preferably 0.1 to 5 μm. The average particle size of the granules can be determined by a laser diffraction method using, for example, LA-920 from Horiba, Ltd. Specifically, a sample to be analyzed is put in a water solvent and dispersed in the provided ultrasonic disperser for 3 minutes, followed by the analysis, and the resulting scattered light intensity distribution is converted to a particle size distribution, from which an average particle size is calculated. As used herein, the term "average particle size" refers to a volume-average particle size.

The thus obtained granules are then subjected to the firing step (3) to convert the precursor to an inorganic oxide. In contrast to the firing in step (1), the firing in step (3) is to form the aimed inorganic oxide. The firing in step (3) can be carried out in an oxygen-containing atmosphere, e.g., the atmospheric air. The firing temperature may be, for example, 250° C. to 1000° C. It is preferred, while not essential, that the firing temperature in step (3) be higher than that in step (1). When the firing temperature in step (3) is higher than that in step (1), it preferably ranges from higher than 600° C. to 1000° C. The firing is performed until the aimed inorganic oxide is formed sufficiently.

The granules fired in step (3) are subjected to step (4) for applying a catalyst to the support. In this step, a catalyst is loaded on the granules. The type of the catalyst is as described supra. In using platinum as the catalyst, for example, platinum may be applied by a known method, such as the ethanol method or the colloid method. The alcohol method is as follows: a dinitrodiammine platinum nitrate solution is diluted with pure water to prepare an aqueous solution; the fired granules are added thereto, followed by mixing and dispersing; ethanol is then added thereto; and the mixture is heated under reflux for several hours to form particulate platinum. The refluxing temperature is preferably about 95° C., and the refluxing time is preferably 3 to 6 hours. In the colloid method, the fired granules are dispersed in a liquid containing platinum-containing colloid to deposit the colloid on the granules. In detail, a reducing agent is added to a liquid containing a colloid precursor containing platinum to reduce the precursor thereby to form platinum-containing colloid, and the fired granules are dispersed in the resulting liquid containing the platinum-containing colloid, whereby the colloid is deposited on the granules in the form of platinum-containing particles. The details of the ethanol method are described, e.g., in JP 9-47659A, and the details of the colloid method are described, e.g., in EP 2214237A1.

The granules having platinum particles deposited thereon are preferably heat treated with the aim of activating platinum. The heat treatment is suitably carried out in a reducing atmosphere, such as hydrogen or carbon monoxide. A hydrogen atmosphere is preferred in terms of prevention of platinum catalyst poisoning problem and ready availability. In using hydrogen, hydrogen may be used at a 100% concentration or may be diluted with an inert gas, such as nitrogen, helium, or argon, preferably to a concentration of 0.1 to 50%, more preferably 1 to 10%, by volume. The temperature of the heat treatment is preferably 80° C. to 350° C. in the interests of successful activation of platinum. The final amount of the catalyst supported on the granules after the heat treatment is preferably 1 to 70 mass %, as expressed in [platinum/(platinum+granules)]×100.

Granules having the catalyst supported thereon (hereinafter also referred to as catalyst-on-granular inorganic oxide) are thus obtained. The resulting catalyst-on-granular inorganic oxide is then subjected to step (5) for catalyst layer formation. In forming a catalyst layer, the catalyst-on-granular inorganic oxide is formulated into an ink to be applied. The ink formulation can be prepared by, for example, mixing the catalyst-on-granular inorganic oxide with a liquid medium, conveniently water. If necessary, a water-soluble organic solvent may be used in combination with water. Examples of useful water-soluble organic solvents include monohydric lower alcohols, such as ethanol and isopropyl alcohol. The water-soluble organic solvents may be used either individually or in combination of two or more thereof. The ink preferably contains a proton conducting polymer. The proton conducting polymer is exemplified by a fluorinated polyolefin resin having sulfonic acid incorporated to the side chain thereof. The components described are mixed together using, for example, a planetary ball mill to make a desired ink.

The mixing for the ink preparation is preferably carried out by first premixing water (and, if necessary, a water-soluble organic solvent) and the catalyst-on-granular inorganic oxide and then mixing the resulting premix with the proton conducting polymer. By this mixing method, the dispersibility of the catalyst-on-granular inorganic oxide in ink is increased, making it easier to successfully form a desired catalyst layer. In the ink, the ratio of the proton conducting polymer to the granular inorganic oxide in terms of that before having catalyst supported thereon is preferably 0.5 to 70 mass %, more preferably 2 to 30 mass %, as expressed in [proton conducting polymer/granular inorganic oxide in terms of that before having catalyst supported thereon]×100.

When a combination of water and a water-soluble organic solvent is used in the premix preparation, the water to water-soluble organic solvent mass ratio preferably falls within the range of water:water-soluble organic solvent=5:95 to 95:5, more preferably 20:80 to 80:20. In mixing the premix with the proton conducting polymer, the proton conducting polymer is preferably used in the form of a dispersion or solution in a water-soluble organic solvent.

The resulting ink is applied to form a catalyst layer on the polymer electrolyte membrane. The ink may be applied directly to the polymer electrolyte membrane, or the ink may be applied to a transfer sheet to form a catalyst layer, which is transferred to the polymer electrolyte membrane. The transfer sheet may be of polytetrafluoroethylene, for example. The ink can be applied by, for example, spraying, spin coating, doctor blade coating, screen printing, or bar coating. The coating layer is dried by, for example, hot air drying or hot pressing, thereby to make a catalyst-coated membrane (CCM).

Figure 2:
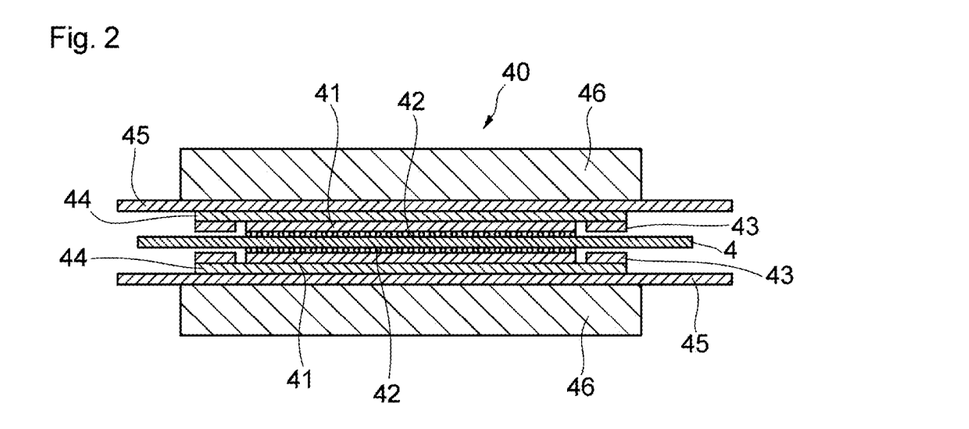
FIG. 2 is a schematic view of a device for transferring a catalyst layer formed on a transfer sheet.
Figure 3:
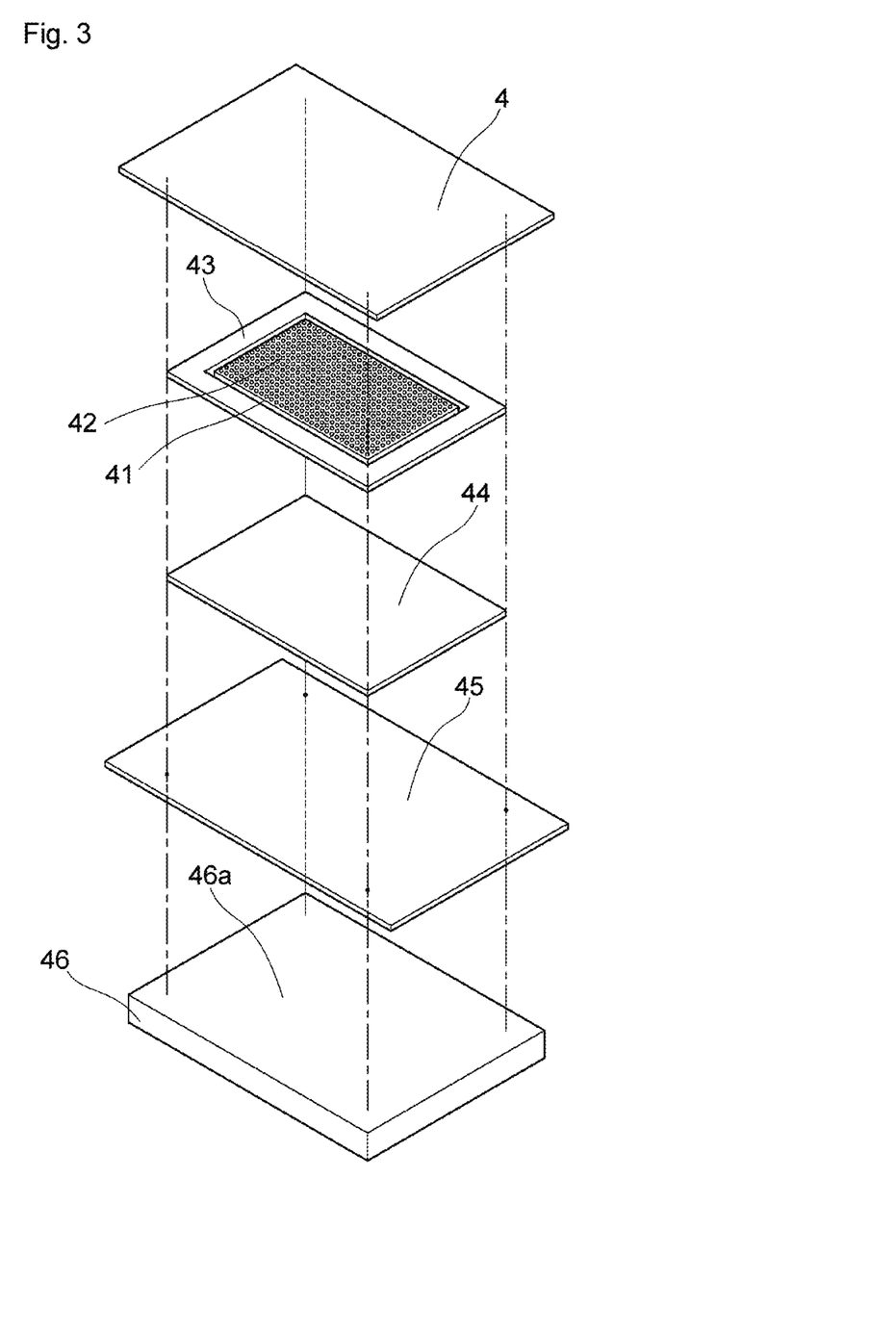
FIG. 3 is an exploded perspective view showing a part of the device illustrated in FIG. 2.

FIG. 2 schematically illustrates a transfer device for transferring a catalyst layer formed on the transfer sheet. The transfer device 40 illustrated is for forming a catalyst layer on both sides of a polymer electrolyte membrane 4. FIG. 3 shows the polymer electrolyte membrane 4 and the lower half of the device 40 shown in FIG. 2 in an exploded mode. The upper half above the polymer electrolyte membrane 4 is omitted because it is symmetrical to the lower half. A transfer sheet 41 is provided on each side of the polymer electrode membrane 4. A catalyst layer 42 is formed on the polymer electrode-facing side of the transfer sheet 41. The perimeter of the transfer sheet 41 is surrounded by a spacer 43. The spacer 43 has an opening in its central portion, in which the transfer sheet 41 lies. The purpose of using the spacer 43 is to protect the polymer electrolyte membrane 4 from deformation due to a level difference that would be produced between the membrane 4 and the transfer sheet 41 if the membrane 4 is larger in size than the transfer sheet 41. The spacer 43 also serves to always apply substantially the same pressure to the transfer sheet 41 even when transfer sheet 41 has a varied area. To accomplish these purposes, the spacer 43 has a thickness substantially equal to that of the transfer sheet 41. The spacer 43 can be of, for example, the same material making the transfer sheet 41.

On the side of the transfer sheet 41 opposite to the catalyst layer 42 is provided a cushioning layer 44. The cushioning layer 44 is used to apply uniform pressure to the transfer sheet 41 in pressure application. The cushioning layer 44 is about the same as or slightly larger than the spacer 43 in size. Next to the cushioning layer 44 is disposed a heat resistant release film 45 to facilitate the release from a pressure member 46 that is disposed adjacent to the cushioning layer 44. The film 45 has a larger size than the cushioning layer 44. The pressure member 46 is a rigid member having a flat pressing surface 46a. The size of the pressing surface 46a of the pressure membrane 46 is substantially equal to or slightly larger than that of the cushioning layer 44. The pressure member 46 may be equipped with a heating means (not shown).

In transferring the catalyst layer 42 formed on the transfer sheet 41 onto the polymer electrolyte membrane 4 by the use of the transfer device 40 having the above described configuration, the pressure applied is preferably 2 to 50 kgf/cm², more preferably 5 to 30 kgf/cm². The pressure member 46 may be heated to perform hot pressing, in which case the pressure member 46 is preferably heated to a temperature of 120° C. to 150° C., more preferably 125° C. to 145° C. The pressure application is usually carried out in the atmospheric air. If desired, other atmospheres, such as an inert gas atmosphere, may be used.

Upon transferring the catalyst layer 42 to each side of the polymer electrolyte membrane 4 by pressure application, the pressure is relieved, and the members of the device 40 are removed to produce a CCM composed of the polymer electrolyte membrane 4 with the catalyst layer 42 on each side thereof.

To make an inorganic oxide support, the aforementioned method involves first and second firing steps, i.e., once firing an inorganic oxide precursor and then fired the resultant again. Instead of this two-stage firing, the firing of the precursor may be done in a single stage (this method will hereinafter be called method 2). In detail, the inorganic oxide precursor obtained in step (1) is fired preferably at a temperature of 250° C. to 1000° C. thereby to form inorganic oxide particles. The firing is carried out until the desired inorganic oxide is formed sufficiently. The firing atmosphere can be an oxygen-containing atmosphere, such as the atmospheric air.

The resulting particulate inorganic oxide thus obtained is processed to have a desired average particle size and subjected to the step of granulation. The average particle size of the particulate inorganic oxide may be the same as that of the precursor particles used in the granulation step (2). The resulting granules are processed in the same manner as in steps 4 and 5 described hereinbefore.

In method 2, the granules obtained by the granulation step may be subjected to a second firing step (this method will hereinafter be referred to as method 2a). The second firing step in method 2a aims to enhance the strength of the granules and also to adjust the specific surface area and/or pore size distribution of the granules. To achieve these objects, the second firing is preferably carried out at 250° C. to 1000° C., more preferably 600° C. to 1000° C. While the second firing is usually conducted in an oxidizing atmosphere, such as the atmospheric air, an inert gas atmosphere or a reducing atmosphere may be used, if necessary.

In method 2 the catalyst is applied to the granules obtained by the granulation step, as described before. Alternatively, the catalyst may be applied to the particulate inorganic oxide before granulation, followed by subjecting the resulting particulate inorganic oxide having the catalyst supported thereon to the granulation step to obtain granules (this method will hereinafter be referred to as method 2b). According to method 2b, the catalyst exists not only on the surface of the inorganic oxide particles forming the granules but also between the inorganic oxide particles. In contrast to this, the catalyst-on-support obtained in methods 1, 2, and 2a described before and method 3 described below has the catalyst mostly only on the surface of the inorganic oxide particles forming the granules. In method 2b, the granules may be subjected to the second firing step as conducted in method 2a where needed.

Instead of methods 2, 2a, and 2b, the inorganic oxide precursor obtained in step (1) may be granulated without being fired (step (2)), and the resulting granules are fired (step (3)) to form granular inorganic oxide (this method will hereinafter be referred to as method 3). Method 3 includes only one firing step. Similarly to the foregoing methods, the firing of the granular precursor can be performed at 250° C.

to 1000° C., more preferably 600° C. to 1000° C. The firing is carried out until a sufficient amount of a desired inorganic oxide is produced. The firing atmosphere may be an oxygen-containing atmosphere, such as the atmospheric air. Afterwards, the fired granules are processed in the same manner as in steps (4) and (5) of method 1.

While the invention has been described with reference to its preferred embodiments, the invention is not limited thereto. For example, while in the foregoing embodiments the electrode catalyst layer of the invention is used as an electrode catalyst layer of a polymer electrolyte fuel cell, the electrode catalyst layer of the invention is also applicable as an electrode catalyst layer of other types of fuel cells, such as alkaline fuel cells, phosphoric acid fuel cells, and direct methanol fuel cells.

In the formation of a catalyst layer in the foregoing embodiments, it is possible that the catalyst is applied to the inorganic oxide particles before being granulated, followed by granulation.

EXAMPLES

The invention will now be illustrated in greater detail with reference to Examples, but it should be understood that the invention is not deemed to be limited thereto. Unless otherwise noted, all the percents are by mass.

Example 1

(a) Formation of Cathode Catalyst Layer
(a-1) Preparation of Inorganic Oxide Precursor Particles In 1630 g of pure water was dissolved 148 g of $Na_2SnO_3$ to prepare a tin-containing aqueous solution. Separately, 5.1 g of $TaCl_5$ was dissolved in 140 ml of ethanol to prepare a tantalum-containing solution. The tantalum-containing solution was mixed with an aqueous solution of 116 g of nitric acid in 1394 g of pure water. The tin-containing aqueous solution was added to the mixed solution, followed by stirring for 1 hour. After the stirring was ceased, the mixture was allowed to stand for 12 hours to form and precipitate a tantalum-containing tin oxide precursor. The reaction mixture was filtered, and the filter cake was washed with water, dried at 60° C., and fired at 450° C. for 5 hours in the atmospheric air.

(a-2) Granulation of Precursor Particles

The fired precursor particles were crushed in an agate mortar to an average particle size of 100 μm or smaller and then pulverized in a ball mill using yttrium-stabilized zirconia balls. In carrying out pulverization in a ball mill, 40 g of the fired precursor particles were mixed with 700 ml of pure water and 40 g of ethanol, and the resulting slurry was used for pulverization. After the pulverization, the slurry was separated from the balls and granulated by spray drying granulation to obtain granules. The granulation conditions were 220° C. in inlet temperature, 60° C. in outlet temperature, 0.15-0.2 MPa in spray pressure, 8.3 ml/min in feed rate, and 10 g/250 ml in slurry concentration.

(a-3) Firing of Granules

The granules obtained were fired at 680° C. for 5 hours in the atmospheric air to produce tantalum-containing tin oxide from the precursor. The resulting tantalum-containing tin oxide granules had a generally spherical shape with an average particle size of 2.68 μm and a volume resistivity of $5.23 \times 10^3$ Ω·cm at 57.3 MPa. The volume resistivity was measured using a powder resistivity measuring system (MCP-PD41 from Mitsubishi Chemical Analytec Co., Ltd.) and a resistivity meter (MCP-T610 from Mitsubishi Chemical Analytec Co., Ltd.).

(a-4) Catalyst Application

Platinum was applied to the tantalum-containing tin oxide granules obtained in (a-3) in accordance with the method described in Example of JP 2006-79904A. Specifically, the method was as follows. A colloidal platinum solution containing 1 g of platinum was prepared using chloroplatinic acid. Sodium hydrogensulfite was added thereto as a reducing agent. After dilution with pure water, the pH of the system was adjusted to 5 by the addition of a 5% sodium hydroxide aqueous solution. Hydrogen peroxide solution was added thereto dropwise for prevention of colloid coagulation. The system was maintained at pH 5 using a 5% sodium hydroxide aqueous solution. The granules were dispersed in the resulting colloidal solution to adsorb the colloidal platinum, collected by filtration, washed, and dried to give granules having platinum supported thereon. The granules were heat treated in a weakly reducing atmosphere (4 vol % $H_2/N_2$) for 2 hours. As a result of analysis, the amount of platinum supported on the granules, being defined to be [Pt/(Pt+granules)]×100, was found to be 7.5% by mass.

(a-5) Formation of Catalyst Layer

The granules having platinum supported thereon weighing 1.24 g were put in a container. Pure water, ethanol, and isopropyl alcohol (amounting to 1.61 g in total) were added thereto in that order in a mass ratio of 35:45:20 to prepare an ink. The ink was dispersed by ultrasonication for 3 minutes. Yttrium-stabilized zirconia balls with a diameter of 10 mm were put in the container, and the ink was agitated on a planetary mixer (Thinky ARE 310) at 800 rpm for 20 minutes. To the ink was added 5% Nafion® (274704-100ML, from Sigma-Aldrich), and the mixture was dispersed by ultrasonication and agitated on a planetary mixer under the same conditions as above. The amount of Nafion added was such that a Nafion to granules mass ratio was 0.074. The thus prepared ink was applied to a polytetrafluoroethylene sheet using a bar coater and dried at 60° C.

(b) Formation of Anode Catalyst Layer

In a container was put 1.00 g of carbon black having platinum supported thereon (TEC10E50E) from Tanaka Kikinzoku Kogyo K.K. Pure water, ethanol, and isopropyl alcohol (amounting to 12.8 g in total) were added thereto in that order in a mass ratio of 45:35:20 to prepare an ink. The ink was dispersed by ultrasonication for 3 minutes. Yttrium-stabilized zirconia balls with a diameter of 10 mm were put in the container, and the ink was agitated on a planetary mixer (Thinky ARE 310) at 800 rpm for 20 minutes. To the ink was added 5% Nafion® (274704-100ML, from Sigma-Aldrich), and the mixture was dispersed by ultrasonication and agitated on a planetary mixer under the same conditions as above. The amount of Nafion added was such that a Nafion to Pt-on-carbon black mass ratio was 0.70. The thus prepared ink was applied to a polytetrafluoroethylene sheet using a bar coater and dried at 60° C.

(c) Making of CCM

Figure 4:
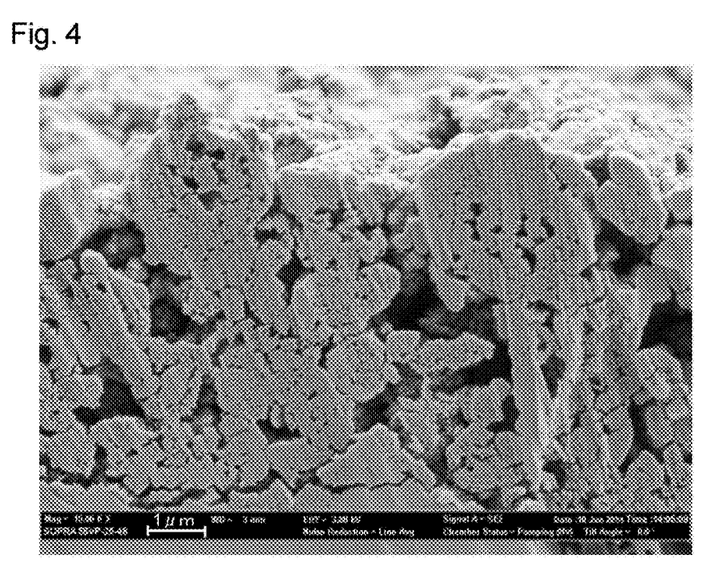
FIG. 4 is an SEM image of a cross-section of the electrode catalyst layer obtained in Example 1.
Figure 5:
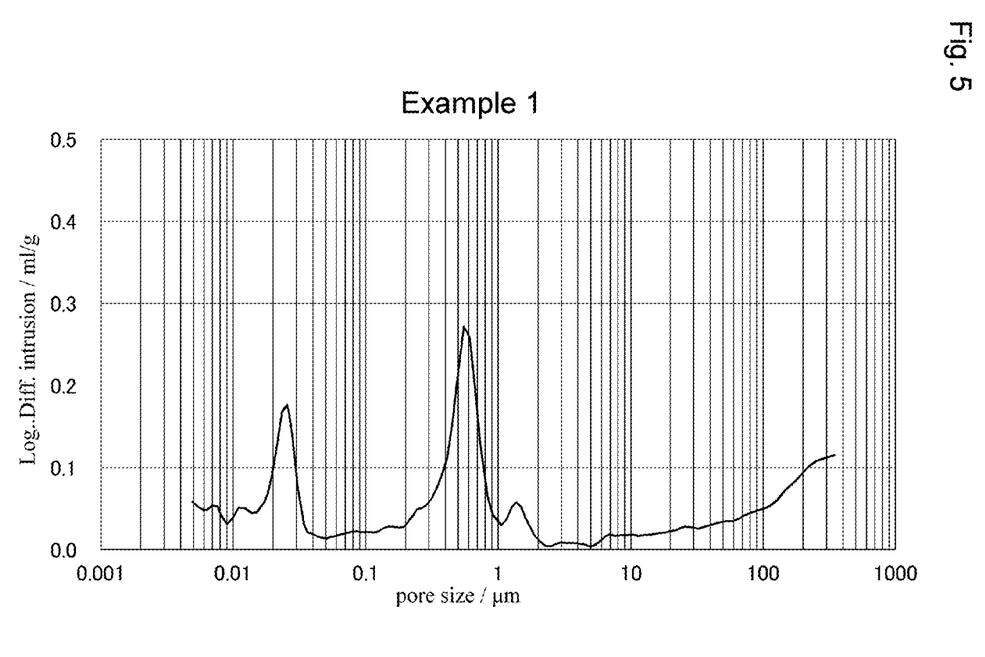
FIG. 5 is a pore size distribution plot of the electrode catalyst layer obtained in Example 1.

Each of the polytetrafluoroethylene sheets having the cathode or anode catalyst layer was cut into a 54-mm square. The cut sheets were superposed on an electrolyte membrane made of Nafion® (NRE-212, from Du-Pont) and hot pressed at 140° C. and 25 kgf/cm² in the atmospheric air for 2 minutes to transfer the catalyst layers. Thus, a cathode and an anode catalyst layer were formed on the opposite sides of the polymer electrolyte membrane of Nafion. The SEM image of a cross-section of the resulting cathode catalyst layer in its thickness direction is shown in FIG. 4. The pore size distribution of the cathode catalyst layer was determined using the polytetrafluoroethylene sheet having the cathode catalyst layer in accordance with the method of mercury intrusion porosimetry described supra. The results obtained are shown in Table 1 and FIG. 5. The amounts of platinum in the cathode catalyst layer and the anode catalyst layer were 0.088 mg-Pt/cm$^2$ and 0.080 mg$_{-Pt}$/cm$^2$, respectively.

(d) Assembling of Fuel Cell

The CCM obtained in (c) above and a JARI standard cell were assembled into a fuel cell. SIGRACET® 25BCH (from SGL Carbon) was used as a gas diffusion layer, and Si/PEN/Si (180 μm) was used as a gasket.

Comparative Example 1

Figure 6:
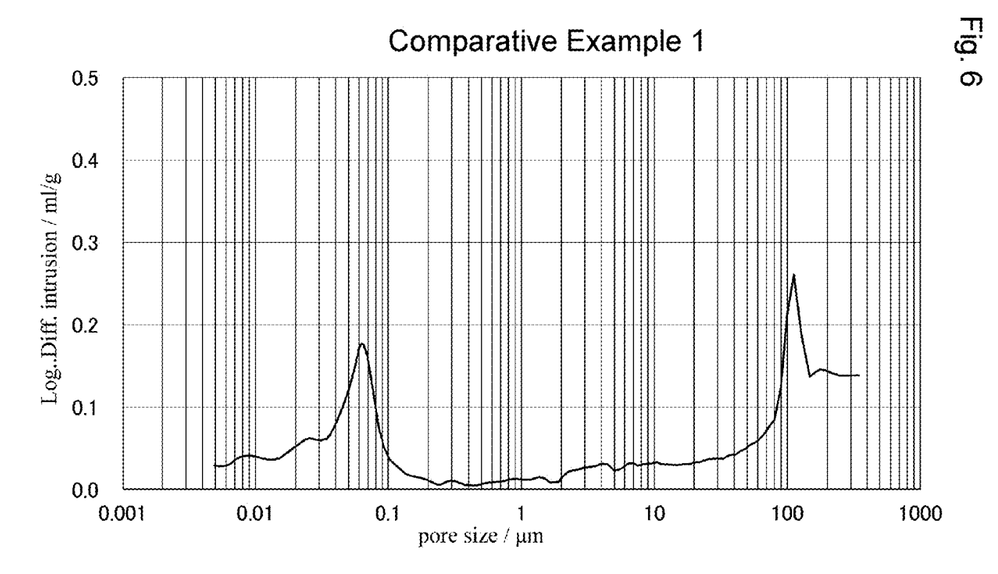
FIG. 6 is a pore size distribution plot of the electrode catalyst layer obtained in Comparative Example 1.

A fuel cell was made in the same manner as in Example 1, except that the granulation step (a-2) was not conducted. The volume resistivity of the tantalum-containing tin oxide was 5.33×10$^2$ Ω·cm at 57.3 MPa. The amount of platinum on the tantalum-containing tin oxide was found to be 7.4% as a result of analysis. The amounts of platinum in the cathode catalyst layer and the anode catalyst layer were 0.078 mg-Pt/cm$^2$ and 0.067 mg-Pt/cm$^2$, respectively. The pore size distribution of the cathode catalyst layer in the fuel cell was determined in the same manner as described above. The results obtained are shown in Table 1 and FIG. 6.

Reference Example

A fuel cell was assembled in the same manner as in Example 1, except for using carbon black having platinum supported thereon (TEC10E50E) in the cathode. The amounts of platinum in the cathode catalyst layer and the anode catalyst layer were 0.071 mg-Pt/cm$^2$ and 0.070 g-Pt/cm$^2$, respectively.

Evaluation

The fuel cells obtained in Example 1 and Comparative Example 1 were evaluated for power generation characteristics as follows. The anode and cathode of the fuel cell were stabilized by passing therethrough nitrogen having been heated to 80° C. and humidified to 100% RH. Thereafter, humidified hydrogen was fed to the anode, and humidified air was fed to the cathode. The degree of humidification was 30% RH, 53% RH, and 100% RH. Under these conditions, the power generation characteristics (current/voltage characteristics) were determined. From the results was calculated an IR-free maximum power output, i.e., a corrected power output obtained by subtracting the voltage reduction due to internal resistance of the fuel cell. The results are shown in Table 1.

TABLE 1

| | | Example 1 | Compara. Example 1 | Reference Example |
|---|---|---|---|---|
| First Peak P1 | Pore Size (μm) | 0.026 | 0.062 | — |
| | Intensity | 0.088 | 0.089 | — |
| Second Peak P2 | Pore Size (μm) | 0.553 | 0.313 | — |
| | Intensity | 0.136 | 0.005 | — |
| Intensity Ratio P2/P1 | | 1.545 | 0.056 | — |

TABLE 1-continued

| | | Example 1 | Compara. Example 1 | Reference Example |
|---|---|---|---|---|
| Maximum Power Output (W/cm$^2$) | 30% RH | 0.419 | 0.213 | 0.294 |
| | 53% RH | 0.443 | 0.314 | 0.433 |
| | 100% RH | 0.443 | 0.327 | 0.481 |

As is apparent from the results in Table 1, it is seen that the fuel cell having the catalyst layer obtained in Example 1 exhibits improved power outputs in both a high humidity atmosphere and a low humidity atmosphere and reduced humidity dependence of the power output as compared with the fuel cell of Comparative Example 1.

Examples 2 to 6

Fuel cells were made in the same manner as in Example 1 except that the average particle size and volume resistivity of the tantalum-containing tin oxide support were changed as shown in Table 2 below by adjusting the feed rate, slurry concentration, and firing temperature in the steps of (a-2) granulation of precursor particles and (a-3) firing of granules and that the amount of platinum in the cathode catalyst layer and the anode catalyst layer in the MEA was changed as shown in Table 2.

Evaluation

The pore size distribution of the fuel cells obtained in Examples 2 to 6 was analyzed by mercury intrusion porosimetry in the same manner as in Example 1 to obtain the first and second peaks. The power generation characteristics (current/voltage characteristics) at 100% RH were also determined in the same manner as in Example 1. A corrected power output was calculated by subtracting the IR-free maximum output from the measured value. The cell voltage at a current density of 0.02 A/cm$^2$ was measured. The results obtained are shown in Table 3, in which the results of Example 1, Comparative Example 1, and Reference Example are also shown.

TABLE 2

| | Support | | Pt Content in MEA (mg-Pt/cm$^2$) | |
|---|---|---|---|---|
| | Average Particle Size (μm) | Volume Resistivity (Ω · cm)@57.3 MPa | Cathode | Anode |
| Example 1 | 2.68 | 5.23 × 10$^3$ | 0.088 | 0.080 |
| Example 2 | 3.54 | 5.40 × 10$^3$ | 0.096 | 0.070 |
| Example 3 | 2.33 | 1.31 × 10$^3$ | 0.083 | 0.070 |
| Example 4 | 2.22 | 3.08 × 10$^3$ | 0.075 | 0.070 |
| Example 5 | 1.88 | 3.55 × 10$^3$ | 0.081 | 0.065 |
| Example 6 | 1.47 | 3.92 × 10$^3$ | 0.074 | 0.070 |
| Compara. Example 1 | — | 5.33 × 10$^2$ | 0.078 | 0.067 |
| Ref. Example | — | — | 0.071 | 0.070 |

TABLE 3

|  |  | Example 1 | Example 2 | Example 3 | Example 4 | Example 5 | Example 6 | Compara. Example 1 | Reference Example |
|---|---|---|---|---|---|---|---|---|---|
| First Peak P1 | Pore Size (μm) | 0.026 | 0.040 | 0.008 | 0.028 | 0.026 | 0.026 | 0.062 | — |
|  | Intensity | 0.088 | 0.113 | 0.128 | 0.153 | 0.140 | 0.131 | 0.089 | — |
| Second Peak P2 | Pore Size (μm) | 0.553 | 0.241 | 0.455 | 0.609 | 0.414 | 0.414 | 0.313 | — |
|  | Intensity | 0.136 | 0.092 | 0.109 | 0.203 | 0.217 | 0.280 | 0.005 | — |
| Intensity Ratio P2/P1 |  | 1.545 | 0.809 | 0.852 | 1.329 | 1.548 | 2.130 | 0.056 | — |
| Max. Power Output (W/cm$^2$) | 100% RH | 0.443 | 0.351 | 0.419 | 0.377 | 0.410 | 0.332 | 0.327 | 0.481 |
| Cell Voltage (V) @0.02 A/cm$^2$ | 100% RH | 0.810 | 0.820 | 0.811 | 0.812 | 0.811 | 0.804 | 0.786 | 0.815 |

As is apparent from the results in Table 3, it is seen that the fuel cells of Examples 2 to 6 achieve higher power outputs in a high humidity atmosphere than the fuel cell of Comparative Example 1. When a comparison is made with the current density being equal, the fuel cells of Examples 2 to 6 have higher cell voltages than the fuel cell of Comparative Example 1.

INDUSTRIAL APPLICABILITY

According to the invention, the well-balanced distribution of portions with a large pore size and portions with a small pore size in the electrode catalyst layer effectively makes it feasible to supply a material to the whole catalyst layer and allows water produced by the electrode reaction to be drained efficiently. As a result, the power output of the cell increases, and the humidity dependence of the power output is reduced.

The invention claimed is:

1. A cathode catalyst layer for fuel cells, having a porous structure and comprising a catalyst supported on a particulate tin oxide support,
the porous structure having a pore size distribution, measured by mercury intrusion porosimetry, showing a first peak in a range of from 0.005 to 0.1 μm and a second peak in a range of from greater than 0.1 μm to 1 μm, the ratio of the intensity P2 of the second peak to the intensity P1 of the first peak, P2/P1, being 0.2 to 10.

2. The cathode catalyst layer according to claim 1, wherein the tin oxide contains at least one of niobium, tantalum, antimony, and tungsten.

3. The cathode catalyst layer according to claim 1, wherein the tin oxide contains fluorine.

4. The cathode catalyst layer according to claim 1, being free of a nonionic polymer.

5. A fuel cell membrane-electrode assembly comprising a polymer electrolyte membrane and the cathode catalyst layer according to claim 1 formed on at least one side of the polymer electrolyte membrane.

6. A method for making a cathode catalyst layer for fuel cells, comprising the steps of:
granulating particles of a tin oxide precursor,
firing the resulting granules to convert the precursor to a tin oxide,
applying a catalyst to the fired granules to form granules having the catalyst supported thereon,
preparing an ink containing the granules having the catalyst supported thereon, and
applying the ink to form a cathode catalyst layer for fuel cells.

7. A method for making a fuel cell cathode catalyst layer for fuel cells, comprising the steps of:
granulating particles of a tin oxide,
applying a catalyst to the resulting granules to form granules having the catalyst supported thereon,
preparing an ink containing the granules having the catalyst supported thereon, and
applying the ink to form a fuel cell cathode catalyst layer.

8. The method according to claim 6, wherein the granules having the catalyst supported thereon have an average particle size of 0.05 to 10 μm.

9. The method according to claim 6, wherein the step of granulating is carried out by spray drying granulation.

10. The cathode catalyst layer according to claim 1, being free of a nonionic polymer.

11. The cathode catalyst layer according to claim 2, being free of a nonionic polymer.

12. The cathode catalyst layer according to claim 3, being free of a nonionic polymer.

13. A fuel cell membrane-electrode assembly comprising a polymer electrolyte membrane and the cathode catalyst layer according to claim 1 formed on at least one side of the polymer electrolyte membrane.

14. A fuel cell membrane-electrode assembly comprising a polymer electrolyte membrane and the cathode catalyst layer according to claim 2 formed on at least one side of the polymer electrolyte membrane.

15. A fuel cell membrane-electrode assembly comprising a polymer electrolyte membrane and the cathode catalyst layer according to claim 3 formed on at least one side of the polymer electrolyte membrane.

16. A fuel cell membrane-electrode assembly comprising a polymer electrolyte membrane and the cathode catalyst layer according to claim 4 formed on at least one side of the polymer electrolyte membrane.

17. The method according to claim 7, wherein the granules having the catalyst supported thereon have an average particle size of 0.05 to 10 μm.

18. The method according to claim 7, wherein the step of granulating is carried out by spray drying granulation.

* * * * *